(12) United States Patent
Qiu et al.

(10) Patent No.: US 7,607,022 B1
(45) Date of Patent: Oct. 20, 2009

(54) CONFIGURABLE ENCRYPTION/DECRYPTION FOR MULTIPLE SERVICES SUPPORT

(75) Inventors: Xin Qiu, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 657 days.

(21) Appl. No.: 09/587,932

(22) Filed: Jun. 6, 2000

Related U.S. Application Data

(60) Provisional application No. 60/138,919, filed on Jun. 11, 1999.

(51) Int. Cl.
*H04N 7/16* (2006.01)
*H04N 7/167* (2006.01)

(52) U.S. Cl. .......................... 713/189; 725/25; 725/31

(58) Field of Classification Search ................. 713/200, 713/160, 201; 380/42, 44, 46; 717/171; 710/36
See application file for complete search history.

(56) References Cited

U.S. PATENT DOCUMENTS

| | | | | |
|---|---|---|---|---|
| 4,238,853 A | * | 12/1980 | Ehrsam et al. ................. | 380/45 |
| 4,531,020 A | * | 7/1985 | Wechselberger et al. ..... | 380/239 |
| 5,016,276 A | * | 5/1991 | Matumoto et al. ............ | 380/45 |
| 5,029,207 A | * | 7/1991 | Gammie ...................... | 380/228 |
| 5,204,900 A | * | 4/1993 | Pires .......................... | 380/233 |
| 5,381,481 A | * | 1/1995 | Gammie et al. ............. | 380/212 |
| 5,400,401 A | * | 3/1995 | Wasilewski et al. ......... | 380/212 |
| 5,420,866 A | * | 5/1995 | Wasilewski ................. | 370/426 |
| 5,602,916 A | * | 2/1997 | Grube et al. ................. | 380/270 |
| 5,638,448 A | * | 6/1997 | Nguyen ....................... | 380/29 |
| 5,689,566 A | * | 11/1997 | Nguyen ...................... | 713/155 |
| 5,729,549 A | * | 3/1998 | Kostreski et al. ............ | 370/522 |
| 5,742,680 A | * | 4/1998 | Wilson ....................... | 380/227 |
| 5,805,706 A | * | 9/1998 | Davis ......................... | 713/153 |
| 5,870,474 A | * | 2/1999 | Wasilewski et al. ......... | 380/211 |
| 5,878,134 A | | 3/1999 | Handelman et al. ........... | 380/4 |
| 6,055,315 A | * | 4/2000 | Doyle et al. ................ | 380/242 |

(Continued)

FOREIGN PATENT DOCUMENTS

EP     89 07375     8/1989

(Continued)

OTHER PUBLICATIONS

PCT International Search Report for International Application No. PCT/US00/15944 mailed Oct. 11, 2000.

(Continued)

*Primary Examiner*—Ponnoreay Pich
(74) *Attorney, Agent, or Firm*—Larry T. Cullen

(57) ABSTRACT

A system to transmit a set of programs from a transmitter to a receiver is used to accommodate different levels of security used for each program. When a high level of security is necessary for transmitting or receiving a program the transmitter and/or receiver is operable to accommodate that level of security. Thus, both transmitters and receivers are operable to be reconfigured to encrypt or decrypt, respectively, at different levels. Accordingly, differing amounts of programs can be transmitted or received based on the resource requirements needed at any level of security. Consequently, a high level of encryption/decryption requires more resources and allows the processing of fewer services, while a lower level of encryption/decryption allows more services to be transmitted/received.

9 Claims, 10 Drawing Sheets

U.S. PATENT DOCUMENTS

| | | | |
|---|---|---|---|
| 6,101,543 A * | 8/2000 | Alden et al. | 709/229 |
| 6,105,134 A * | 8/2000 | Pinder et al. | 713/170 |
| 6,128,735 A * | 10/2000 | Goldstein et al. | 713/166 |
| 6,226,618 B1 * | 5/2001 | Downs et al. | 705/1 |
| 6,263,313 B1 * | 7/2001 | Milsted et al. | 705/1 |
| 6,424,717 B1 * | 7/2002 | Pinder et al. | 380/239 |
| 6,609,202 B1 * | 8/2003 | Chan | 713/189 |
| 7,106,861 B1 * | 9/2006 | Nishimura et al. | 380/200 |
| 2001/0046295 A1 * | 11/2001 | Sako et al. | 380/201 |
| 2003/0005292 A1 * | 1/2003 | Matthews et al. | 713/160 |

FOREIGN PATENT DOCUMENTS

| | | |
|---|---|---|
| EP | 99 27654 | 6/1999 |
| WO | WO 94/10775 * | 5/1994 |
| WO | WO 9724832 A1 * | 7/1997 |
| WO | WO 9927654 A2 * | 6/1999 |

OTHER PUBLICATIONS

PCT International Search Report for International Application No. PCT/US00/15870 mailed Oct. 11, 2000.

* cited by examiner

| SINGLE DES (16 SERVICES) MODE - 00 | DES-ABA (8 SERVICES) MODE - 01 | DES-ABC (4 SERVICES) MODE - 10 | DES-ABC4 (2 SERVICES -4 IVS) MODE - 11 |
|---|---|---|---|
| C-IV | C-IV | C-IV | NOT USED |
| N-IV | N-IV | N-IV | |
| S0 { C-A-0 / N-A-0 | S0 { C-A-0 / N-A-0 | S0 { C-A-0 / N-A-0 | C-A-0 / N-A-0 |
| S1 { C-A-1 / N-A-1 | C-B-0 / N-B-0 | C-B-0 / N-B-0 | C-B-0 / N-B-0 |
| S2 { C-A-2 / N-A-2 | S1 { C-A-1 / N-A-1 | C-C-0 / N-C-0 | C-C-0 / N-C-0 |
| S3 { C-A-3 / N-A-3 | C-B-1 / N-B-1 | NOT USED | S0 { C-IV0-0 / N-IV0-0 |
| S4 { C-A-4 / N-A-4 | S2 { C-A-2 / N-A-2 | S1 { C-A-1 / N-A-1 | C-IV1-0 / N-IV1-0 |
| S5 { C-A-5 / N-A-5 | C-B-2 / N-B-2 | C-B-1 / N-B-1 | C-IV2-0 / N-IV2-0 |
| S6 { C-A-6 / N-A-6 | S3 { C-A-3 / N-A-3 | C-C-1 / N-C-1 | C-IV3-0 / N-IV3-0 |
| S7 { C-A-7 / N-A-7 | C-B-3 / N-B-3 | NOT USED | NOT USED |
| S8 { C-A-8 / N-A-8 | S4 { C-A-4 / N-A-4 | S2 { C-A-2 / N-A-2 | C-A-1 / N-A-1 |
| S9 { C-A-9 / N-A-9 | C-B-4 / N-B-4 | C-B-2 / N-B-2 | C-B-1 / N-B-1 |
| S10 { C-A-10 / N-A-10 | S5 { C-A-5 / N-A-5 | C-C-2 / N-C-2 | C-C-1 / N-C-1 |
| S11 { C-A-11 / N-A-11 | C-B-5 / N-B-5 | NOT USED | S1 { C-IV0-1 / N-IV0-1 |
| S12 { C-A-12 / N-A-12 | S6 { C-A-6 / N-A-6 | S3 { C-A-3 / N-A-3 | C-IV1-1 / N-IV1-1 |
| S13 { C-A-13 / N-A-13 | C-B-6 / N-B-6 | C-B-3 / N-B-3 | C-IV2-1 / N-IV2-1 |
| S14 { C-A-14 / N-A-14 | S7 { C-A-7 / N-A-7 | C-C-3 / N-C-3 | C-IV3-1 / N-IV3-1 |
| S15 { C-A-15 / N-A-15 | C-B-7 / N-B-7 | NOT USED | NOT USED |

C: CURRENT   N: NEXT   S: SERVICE   x-x-xx: C/N-KEY A/B/C-S

CONFIGURABLE ENCRYPTION/DECRYPTION FOR MULTIPLE SERVICES SUPPORT

This application claims the benefit of U.S. provisional application 60/138,919 filed on Jun. 11, 1999.

BACKGROUND OF THE INVENTION

This invention relates generally to digital processing and more specifically to resource allocation in an encryption/decryption processing system.

In mass distribution systems (such as in the cable industry), a supplier (such as a cable company) typically supplies different services (e.g., cable programs, subtitles, foreign language audio tracks, an internet connection, audio programs, pay-per-view channels, a programming guide, etc.) to different customers. The services provided to each individual customer will consequently vary according to the requirements of that individual customer. Furthermore, the necessary level of security (e.g., the level of decryption necessary to decrypt a supplied service datastream) required for each customer will vary depending on the services ordered by each customer.

While the services ordered by each customer may vary, it is cost effective to have all customers utilize the same equipment at the receiving end of the distribution system, e.g., the set-top boxes used in cable customers' homes should be the same. This allows mass production of the receiving equipment and facilitates distribution and stocking of equipment and replacement parts.

Thus, there are competing needs. There is the desire to allow an individual customer to select and optimize the program content received. Similarly, there is the desire to have all customers use similar equipment.

Existing systems have been unable to satisfy these needs. They have typically defaulted to supplying the same type of equipment to all customers and configuring that equipment to provide decryption of a signal that has been encrypted at the highest level of encryption encountered by all customers' requirements. This is undesirable from the individual customer standpoint, because those customers who order services with low level security are still required to use a receiver that is configured to provide decryption of a service having a high level of security. Thus, due to memory constraints inherent in most devices, the configuration of that receiver is unnecessarily limited. For example, when a higher level of encryption is utilized, a receiver must devote more memory to storing keys and data to decrypt the signal. Thus, fewer services can be decrypted when at least one of those services has a high level of encryption.

Others have also defaulted to supplying different equipment to different customers. Thus, customers with high level of decryption needs can utilize equipment having a high level of decryption but receive fewer services. Similarly, customers who have a setup in which only low level encrypted services will be received are given equipment that decrypts at the low level decryption scheme. Thus, such a customer can receive more services encrypted at this low level of encryption as compared to the customer who receives high level encrypted signals when each customer's equipment utilizes a similar amount of memory.

Similarly, there is a need at the sending end of a transmission for a system that permits a datastream to be encrypted at different levels of security. Namely, there is a need for an encryption system that is configurable such that it can encrypt a datastream at a variety of levels of encryption. This will allow the encryption system to provide several services encrypted at a low level of encryption while also providing a high level of encryption when only a few services are transmitted to a customer. Similarly, there is a need for this circuitry to be reconfigurable such that the same circuitry or integrated circuit can be utilized to accomplish both types of encryption.

SUMMARY OF THE INVENTION

A method of providing data comprises storing a first set of encryption data associated with a first data stream, encrypting the first data stream at that level of encryption, storing a second set of encryption data associated with a second data stream, encrypting the second data stream at the second level of encryption which is different from the first level of encryption, and utilizing a common memory to encrypt both the first data stream at the first level of encryption and the second data stream at the second level of encryption. According to one aspect of the invention, a different number of services are encrypted according to the level of encryption that is utilized to encrypt the services. Yet another aspect of the invention allows a similar system to be utilized to decrypt messages encrypted at different levels of encryption by utilizing different decryption algorithms loaded into a common memory.

Another aspect of the invention allows a reconfiguration circuit to be utilized to reconfigure a processor to operate on cryptographic data, such that the processor is operable to process different encryption or decryption levels.

Thus, the different embodiments of the invention satisfy needs left unfulfilled by existing systems. Other and further features of the invention will be apparent to those skilled in the art from a consideration of the following description taken in conjunction with the accompanying drawings wherein certain methods of and apparatuses for practicing the invention are illustrated. However, it is to be understood that the invention is not limited to the details disclosed but includes all such variations and modifications as fall within the spirit of the invention and the scope of the appended claims.

BRIEF DESCRIPTION OF THE DRAWINGS

FIGS. 9a-9d illustrate various memory maps that can be used in conjunction with the Single DES, DES-ABA, DES-ABC, and DES-ABC4 encryption/decryption algorithms, respectively, as well as the number of services that can be accomplished in the common memory space.

DESCRIPTION OF THE SPECIFIC EMBODIMENTS

Figure 1A:
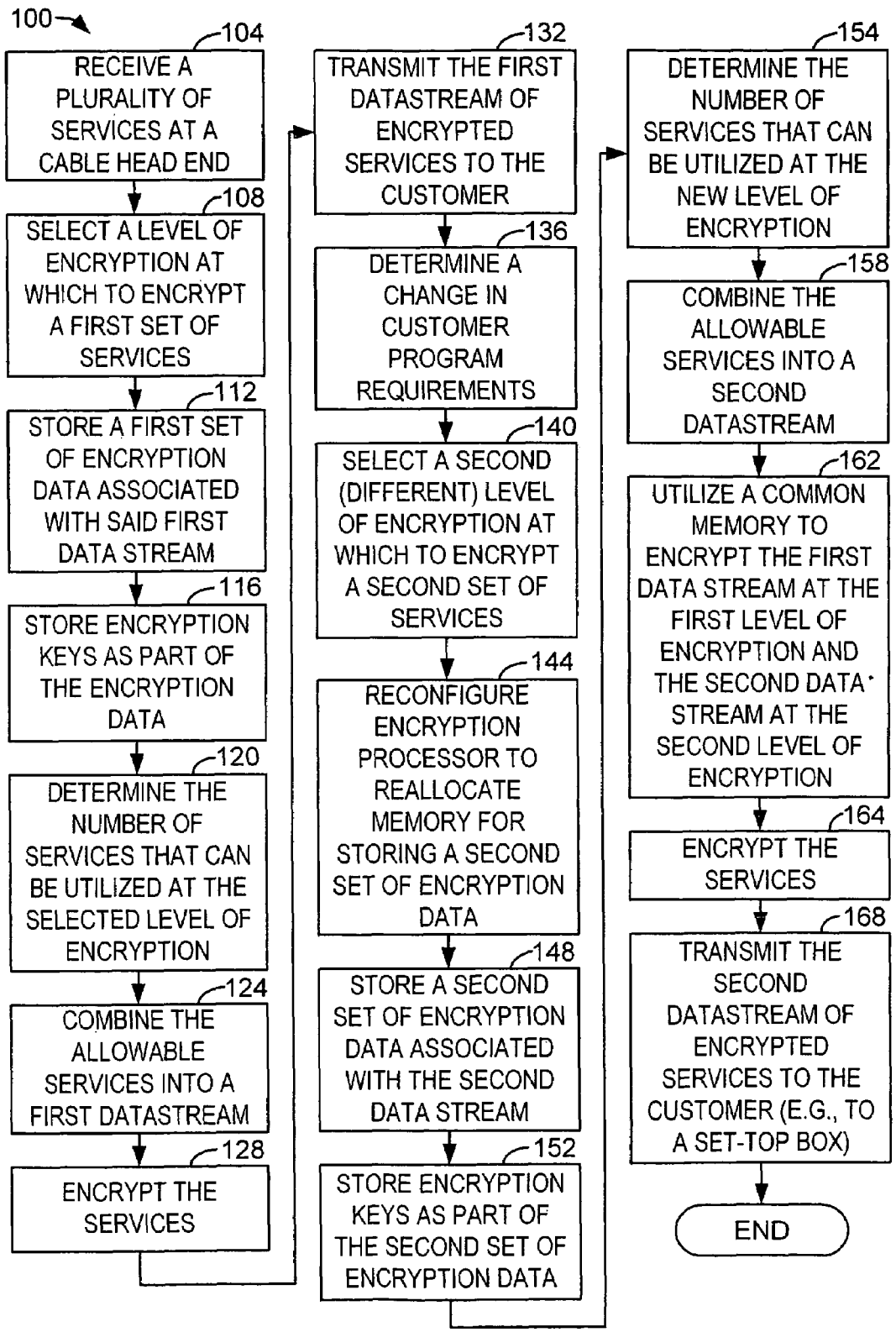
FIGS. 1a and 1b are flow charts illustrating the transmission and receipt, respectively, of two sets of services to a customer at different levels of encryption.

Referring now to FIG. 1a, a preferred embodiment of the invention can be seen. A distributor of services such as a cable company receives several services for distribution to its customers 104. Examples of different sets of such services can be seen in Tables 1 and 2 below. For example, a background service like an interactive program guide might be available for distribution to a customer. Similarly, a number of programs with different program content are likely available as well. As part of each program, a variety of different audio and video options could be offered for each program. For example, a customer could be offered a Spanish audio service in addition to English. Similarly, subtitles could be provided for a program. In addition, services might be made up of data connections to a computer network such as an intranet or the Internet. Thus, a distributor is often in a position to offer many different services.

TABLE 1

| SERVICE NO. | SERVICE NAME/NOTATION | DESCRIPTIONS |
|---|---|---|
| 1 | background service - B | such as interactive Program Guide (IPG). |
| 2 | video 1 service - $V_1$ | to support a video with two audio. |
| 3 | audio 1 service - $A_1$ | audio 1 service could be in one language to support its corresponding video ($V_1$). |
| 4 | audio 2 service - $A_2$ | audio 2 service could be in another language to support its corresponding video ($V_1$). |
| 5 | subtitle service - $ST_1$ | to support subtitle service. |
| 6 | video 2 service - $V_2$ | by supporting $V_2$ along with $V_1$, we can support picture-over-picture service (have two programs displayed at screen simultaneously). |
| 7 | (audio 2 service for $V_2$-$AV_2$) | to support picture-over-picture service, $AV_2$ may not be necessary. But by supporting $AV_2$, we can provide customer with recording (to VCR) capability. |

TABLE 2

| SERVICE NO. | SERVICE NAME/NOTATION | DESCRIPTIONS |
|---|---|---|
| 1 | background service - B | such as interactive Program Guide (IPG). |
| 2 | video 1 service - $V_1$ | to support a video with two audio. |
| 3 | audio 1 service - $A_1$ | audio 1 service could be in one language to support its corresponding video ($V_1$). |
| 4 | data service - $D_1$ | data channel to support Web browser. |

TABLE 3

| SECURITY LEVEL | NO OF SERVICES | MEMORY |
|---|---|---|
| SINGLE DES MODE | 16 | 1 Kilobyte |
| TRIPLE DES ABA MODE (2 KEYS) | 8 | 1 Kilobyte |
| TRIPLE DES ABC MODE (3 KEYS) | 4 | 1 Kilobyte |
| TRIPLE DES ABC 4 IV'S MODE | 2 | 1 Kilobyte |

Each service does not necessarily have a common level of security with the other services ordered by a customer, however. For example, transmission of a service comprising a local television station signal will have a very low level of security while a service of a pay-per-view station signal will require a higher level of security.

Figure 2:
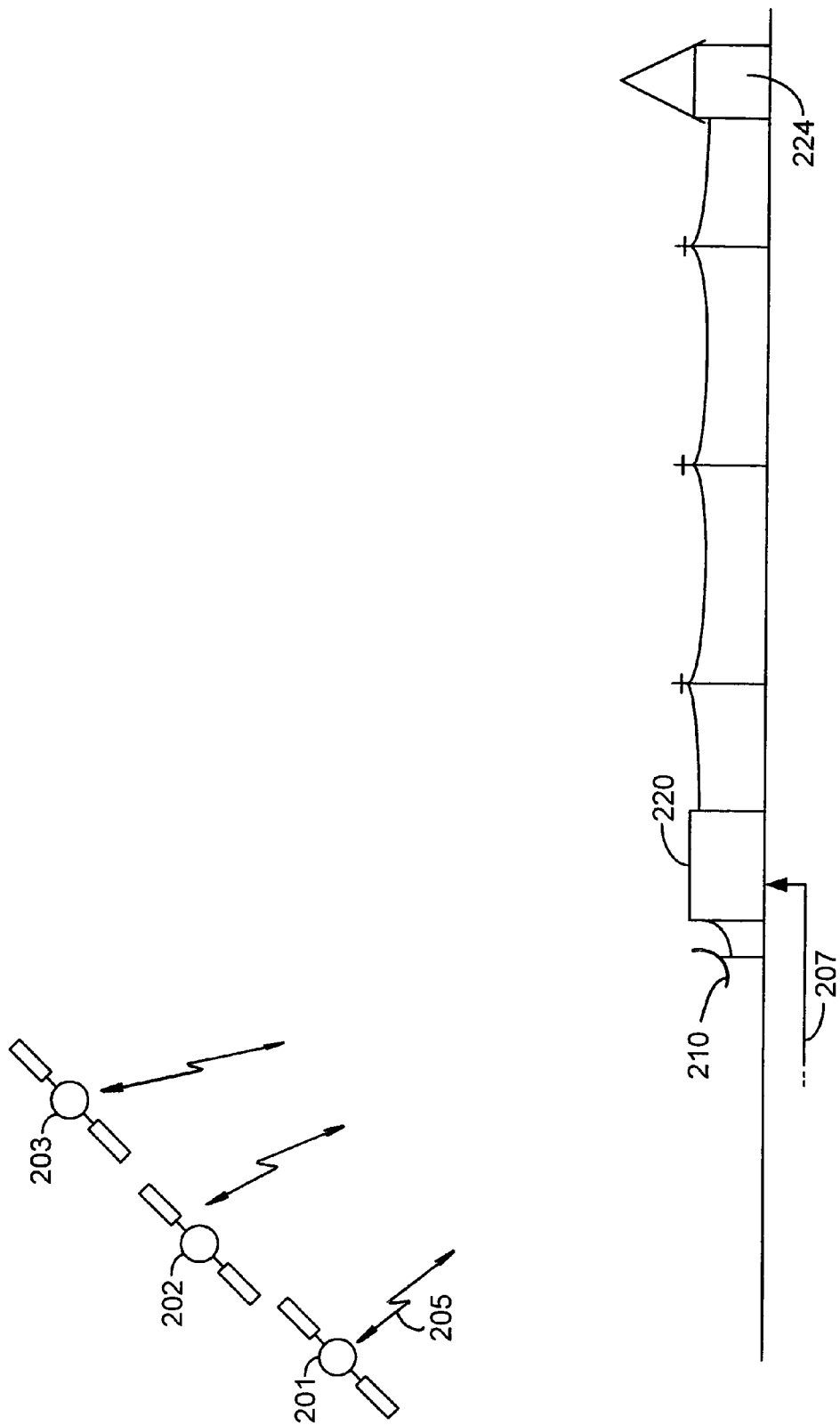
FIG. 2 illustrates the receipt of different program data from satellites and distribution from the cable head end to a representative customer.

As FIG. 2 demonstrates, the source of the various services can originate from a variety of sources. Oftentimes, the source will be from signals broadcast through satellites, such as satellites 201, 202 and 203 to a satellite receiver 210. Other sources might be a landline transmitted signal such as landline 207. Similarly, a service might be generated at the cable head end 220 before being distributed over the cable company's distribution system to end-user 224.

An end-user will typically select the types of services that are desired to be received from the distributor of services. A level of encryption is selected for the set of services to be sent to the end-user 108. For example, an end-user might select a movie channel having a high level of security. In such a case, the movie channel would be sent to the end-user with a number of other services. The number of services will depend on the number of services that can be encoded when the selected type of encryption for the movie channel is utilized. Namely, a high level of encryption will limit the resources that are available to a processor. Hence, fewer services can be encrypted by a processor with a fixed memory space when the processor is responsible for encrypting a service at a high level of encryption as compared to the number of services that can be encrypted when the processor is encrypting the same services at a lower level of encryption.

Figure 4:
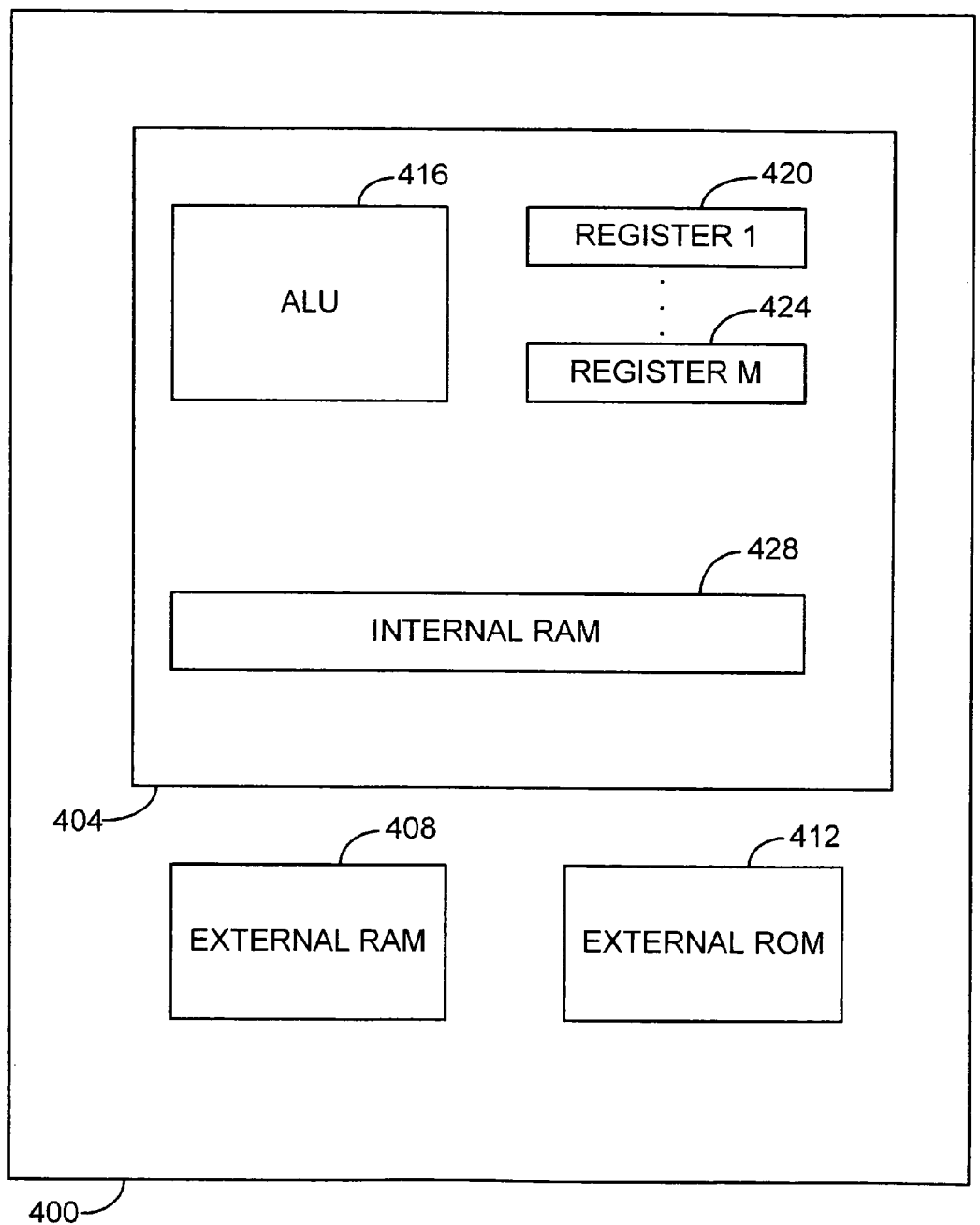
FIG. 4 is a block diagram illustrating the components of a receiver of an encrypted signal such as a set-top box.

Once the distributor of services, such as the cable company, has determined the necessary level of encryption at which to encrypt the set of services destined for an end-user, a corresponding set of encryption data is loaded into the encryptor. Preferably, the encryption device is an integrated circuit such as that shown in FIG. 4. The device in FIG. 4 is unique in that it can serve as both an encryption and decryption device. Namely, encryption and/or decryption algorithm codes can be stored in its internal memory, until they are needed. Then, when needed, the processor 404 utilizes the loaded cryptographic codes and associated keys to cryptographically process a datastream received by device 400. Hence, depending on whether encryption or decryption is to be accomplished, the memory of integrated circuit 404 can be stored with encryption or decryption algorithms, respectively. Thus, the integrated circuit 404 is universal in that it can be utilized in either an encryption or decryption device.

Encryption keys are preferably stored as part of the encryption data 116 in one of the registers of integrated circuit 404, such as "Register 1" 420 or "Register M" 424 along with the encryption algorithm code stored in internal memory. Similarly, the encryption keys can also be stored in internal RAM 428. Thus, the encryption keys and the encryption code necessary to implement the encryption algorithm comprise the encryption data. It should be noted that in some cases encryption code might be loaded piecemeal from external memory into the processor's internal memory. Thus, it is not necessarily required that all of the encryption code be resident in the processor at all times.

The number of services that can be utilized when the processor implements the highest selected level of encryption is determined 120 as shown in FIG. 1*a*. As noted earlier, this number of services will depend on the type of encryption selected. When a service will require a high level of encryption, then the processor will only be able to encrypt a given number of services because the fixed memory resources of the processor will only permit that many services to be encrypted. A priority scheme can be established by the user, by the end-user or by both in order to determine which services are preferred. Thus, if the number of services is limited in order to accommodate a high level of encryption, the determination as to which services are sent to the end-user can be predetermined.

Once the services are determined, they are combined into a datastream 124. In the preferred embodiment, this is accomplished utilizing the MPEG-2 standard to create a transport stream. Such a transport stream would packetize the various services such that they could be sent to the enduser. Preferably, after the datastream is transformed into a datastream, the datastream is encrypted 128. Thus, the datastream is input into an encryptor, such as the circuit of FIG. 4. The encryption algorithm code which has been loaded into integrated circuit 404 is then utilized along with associated encryption keys to encrypt the datastream which is comprised of the selected services. The encrypted datastream is transmitted to the end-user, such as a cable customer 132. The end-user receives the encrypted datastream and processes it in a reverse order so as to retrieve the services. Thus, the end-user is able to decrypt the datastream and parse the MPEG-2 formatted datastream so as to obtain the data for the services.

This procedure can continue until a change in encryption level is required. Consider the situation where the cable company needs to encrypt at a higher level of encryption than what the customer is receiving. The encryption device at the cable headend and the decryption device at the customer's location will be re-configured to implement the higher levels of encryption and decryption, respectively.

Once the need for the new level of encryption is detected, the new level of encryption, i.e., a level of encryption that differs from the level of encryption used by the previous datastream, is selected 140. The encryption device is then reconfigured to accommodate the new level of encryption. Preferably, this occurs by re-allocating the memory of the encryption processor to store a second set of encryption data 144. Such encryption data would be comprised of the encryption algorithm code for use by the processor and the accompanying encryption keys. The keys might be moved from a reserved register to a more immediate register. It should be noted that key information could be retained by the processor in order to maintain its security. Thus, the second set of encryption data associated with the new encryption level is stored in the processor 148 as are the encryption keys 152. As an alternative, the encryption code could be loaded from external memory.

Given the new level of encryption, the number of services that can be accommodated by the new level of encryption is determined 154. Typically, this will be a predetermined number given the known memory requirements for each algorithm and the size of the processor memory. For example, for a processor having a memory size of one kilobyte, Table 3 shows the number of services that can be encrypted using a variety of encryption algorithms. As can be seen, when the Data Encryption Standard, having only one key, is utilized, the number of services that can be encrypted with a memory size of one kilobyte is sixteen. In contrast, when a more memory intensive level of encryption is utilized, such as Triple DES-ABC with four Initialization Vectors, only two services can be encrypted by the processor with a memory space of one kilobyte. Thus, this aspect of the invention is useful in that it prevents the processor from failing by tracking how many services can be provided for a given level of encryption and a given size memory of the processor.

Once the number of services is determined, the allowable services are combined into a second datastream 158. The second datastream will differ from the first datastream due to the differing services allowed by the new level of encryption. Again, the MPEG-2 standard is preferably used. At this stage, the encryption device, such as processor 404, is utilized to encrypt the services 164 in the second datastream. The fixed memory of the processor is utilized to accomplish this encryption. Thus, the memory is considered common between the encryption of the first data stream and the second data stream in that it does not change in storage size when a new encryption process is implemented 162. The second datastream is then transmitted to the end-user, e.g., to the set-top box of a customer.

Figure 1B:
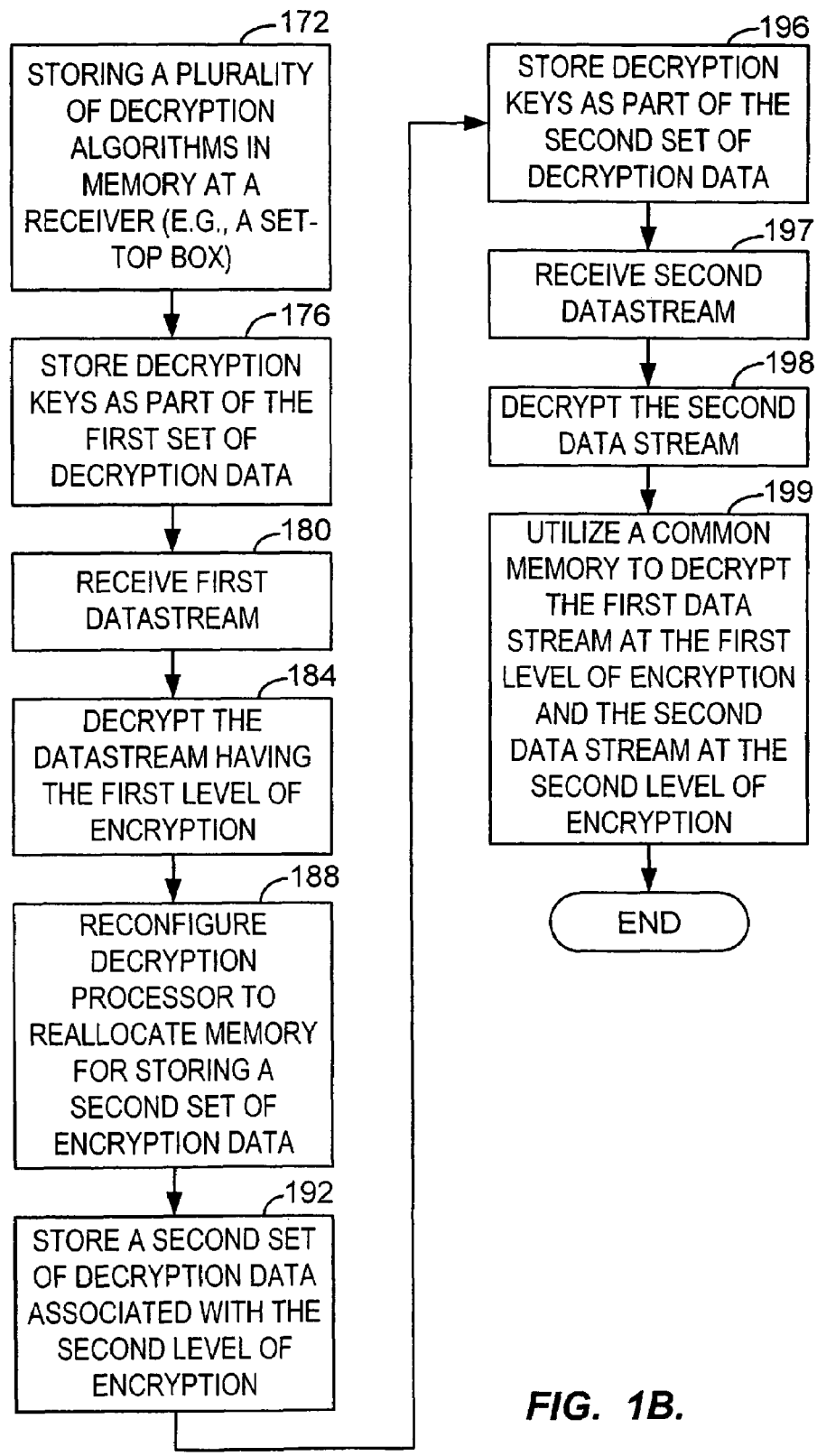

FIG. 1*b* illustrates the preferred embodiment of the invention at the receiving end of the datastreams. Such a receiver could be a set-top box for use in receiving cable signals. Alternatively, it could be a consumer electronics device that receives encrypted data. The operation of the receiver closely parallels the operation of the configurable encryption device. Similar hardware can be utilized. However, instead of encryption code being stored by the receiver, decryption code would be stored by the receiver. Thus, in FIG. 1*b*, the first feature shown is that of storing more than one decryption algorithms in the memory of the receiver 172. These algorithms would be stored in the memory of the receiver. Decryption keys would also be stored in the processor as part of this first set of decryption data 176. Preferably, the decryption keys would be stored by the cable company in the registers of the processor of the receiver in order to prevent an attacker from obtaining the keys from external memory.

The decryption device receives a datastream for decryption 180 and decrypts the datastream 184. The decryption data is utilized to accomplish this. However, when the encryption level is changed, the decryption processor must be reconfigured to accommodate the new level of encryption 188. Thus, the decryption processor is reconfigured just as was the encryption processor as explained above. To accommodate the second level of encryption, a second set of decryption data is stored in the processor 192. Similarly, decryption keys are stored as part of the second set of decryption data 196. As noted earlier, the decryption keys can be stored in registers of the decryption processor in order to secure their values. However, part of the reconfiguration might entail moving the keys from one register to a different register so as to facilitate access. Furthermore, code (or at least the first portion of the code) for the new decryption algorithm could, as an alternative to being permanently resident in internal memory of the processor, be moved from external memory to internal memory. While the apparatus of FIG. 4 was described earlier with reference to an encryption device, it would also be applicable as the decryption device.

The second datastream is then received by the receiver 197. The decryption device then decrypts this second data stream 198. Again, this decryption is accomplished using a common memory of the decryption device to decrypt both the first and second datastreams 199.

The process of switching encryption or decryption levels can be accomplished repeatedly. Thus, as the decision to change is made, single processor can be utilized to implement different levels of encryption or decryption while providing the maximum number of services allowable for a given memory constraint of the processor.

Figure 3:
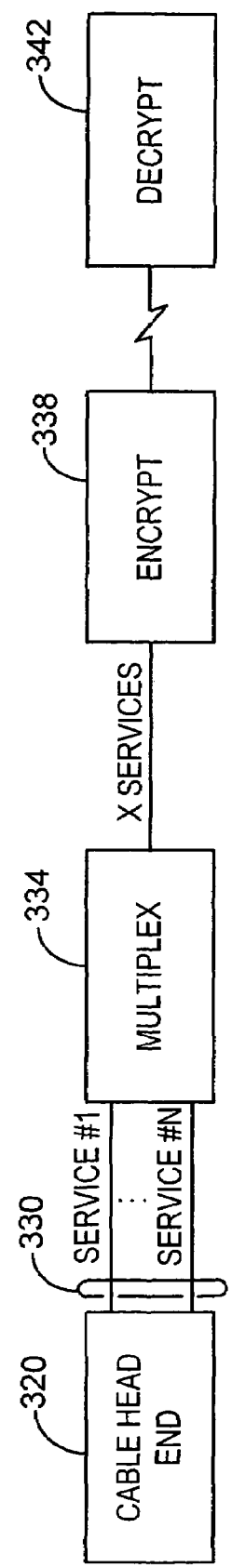
FIG. 3 is a block diagram illustrating the transmission of a portion of the N services available at the cable head end, encryption of the selected services, and decryption for use by the customer.

FIG. 3 illustrates a block diagram representation of an encryption/decryption system. In FIG. 3, a cable head end 320 establishes services 1-"N" 330. Based on the number and priority of the services to be sent to an enduser, these services are multiplexed into a datastream by multiplexer 334 into a stream of "X" services. The stream of "X" services is then encrypted by encryptor 338 and transmitted to the end-user. At the end-user the stream is decrypted by decryptor 342.

Figure 5:
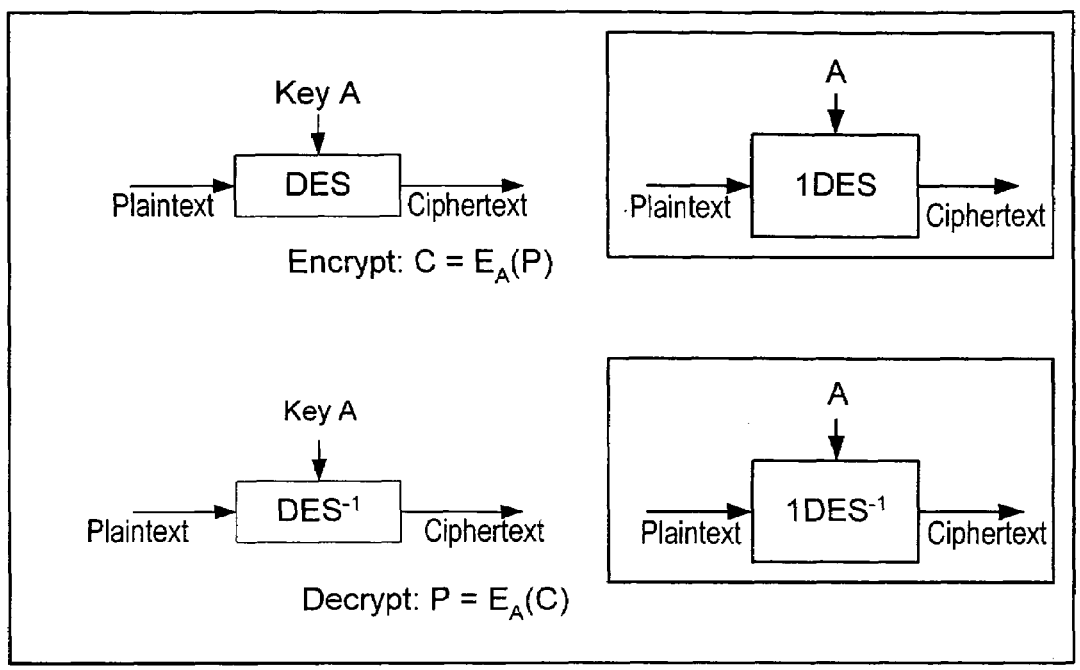
FIG. 5 is a schematic diagram illustrating the operation of a Single Data Encryption Standard (DES) mode of encryption and decryption using a single key (A), as well as symbolic notations for such operations.
Figure 6:
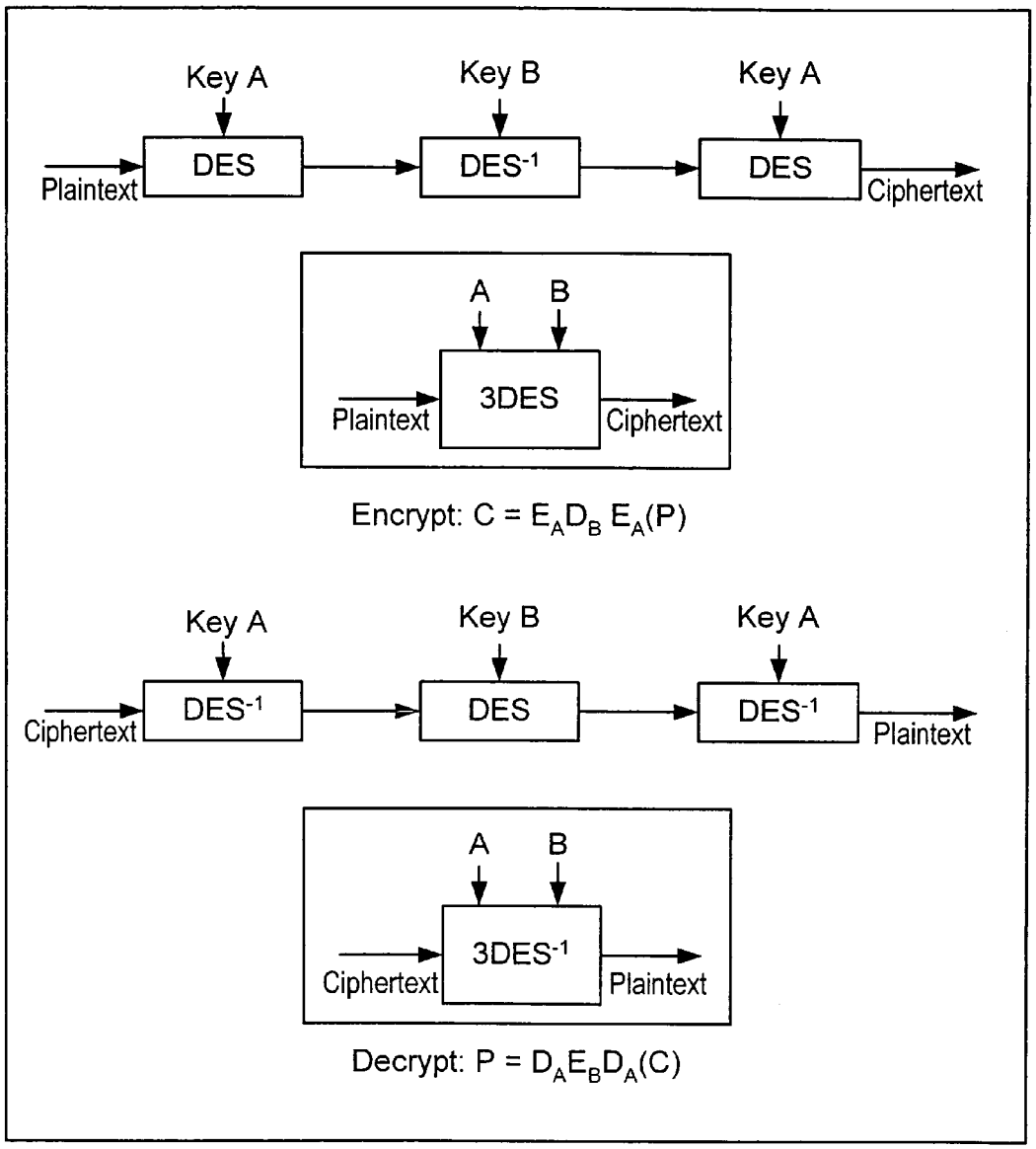
FIG. 6 is a schematic diagram illustrating the operation of a Triple Data Encryption Standard ABA mode of encryption and decryption using two keys (A and B), as well as symbolic notations for such operations.
Figure 7:
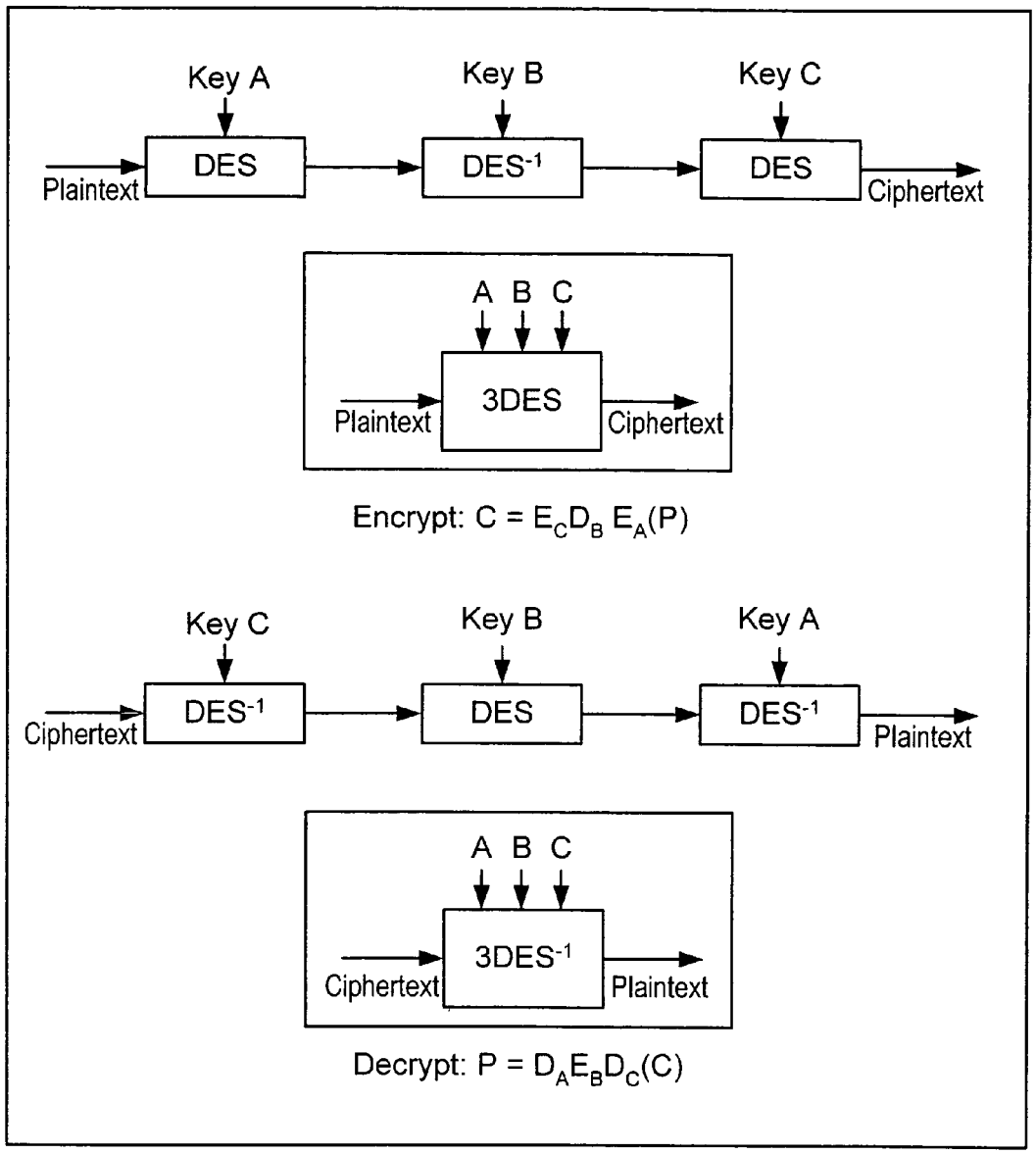
FIG. 7 is a schematic diagram illustrating the operation of a Triple DES-EDE using keys A, B, and C mode of encryption and decryption, as well as symbolic notations for such operations.
Figure 8:
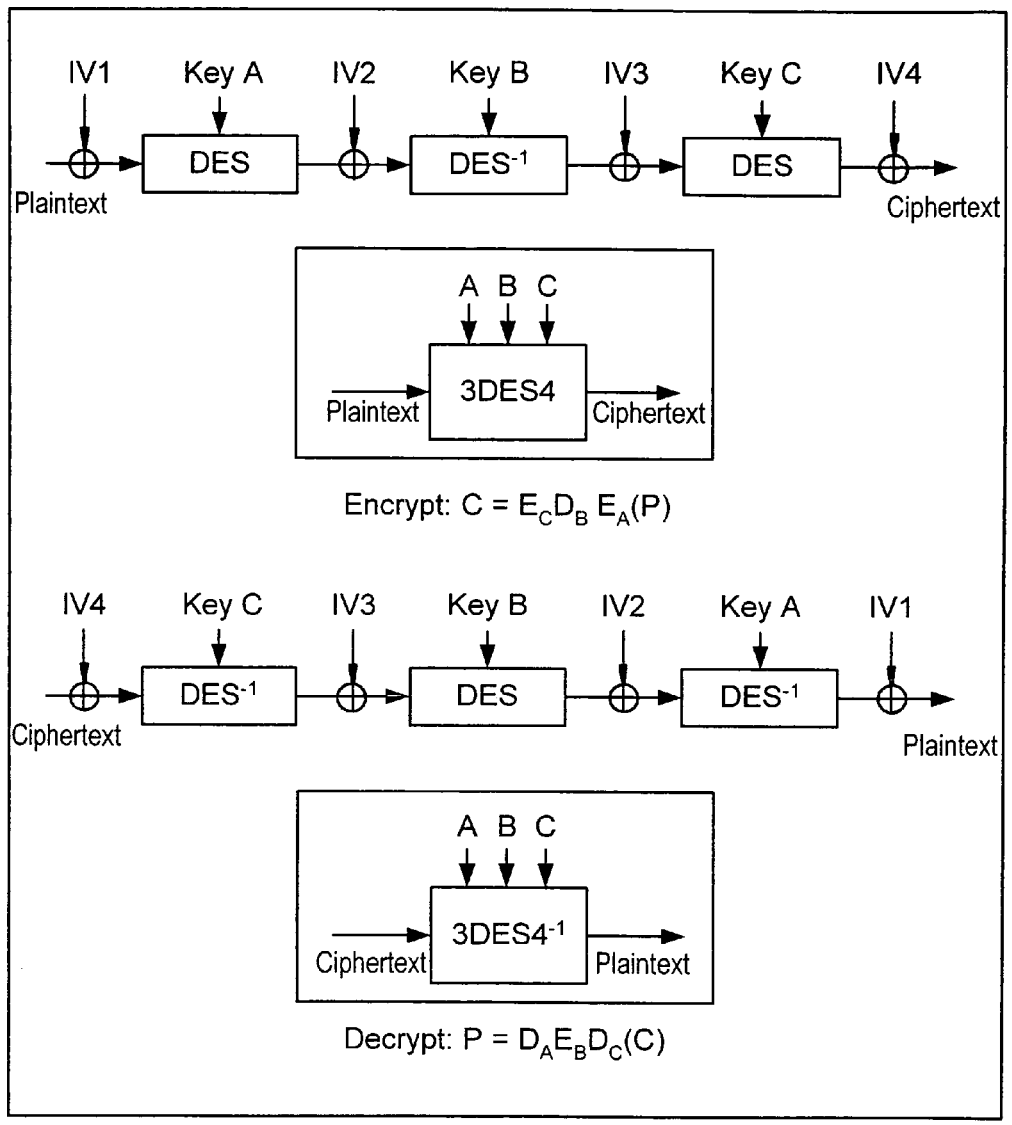
FIG. 8 is a schematic diagram illustrating the operation of a Triple DES-EBE-ABC-4IV mode of encryption and decryption, as well as symbolic notations for such operations.

FIGS. 5, 6, 7, and 8 illustrate encryption/decryption algorithms contemplated for the invention. FIG. 5 is a schematic diagram illustrating the operation of a Single Data Encryption Standard (DES) mode of encryption and decryption using a single key (A). FIG. 6 is a schematic diagram illustrating the operation of a Triple Data Encryption Standard ABA mode of encryption and decryption using two keys (A and B). FIG. 7 is a schematic diagram illustrating the operation of a Triple DES-EDE using keys A, B, and C mode of encryption and decryption. FIG. 8 is a schematic diagram illustrating the operation of a Triple DES-EBE-ABC-4IV mode of encryption and decryption. Symbolic notations are also noted in these figures. The actual implementation of each mode would be understood by those of ordinary skill in the art and is omitted for the sake of conciseness.

FIGS. 9a, 9b, 9c and 9d are demonstrative in showing how a fixed memory size can only support a given number of services when a particular encryption/decryption algorithm is implemented. As can be seen in FIG. 9a, data to encrypt or decrypt services S0-S15, i.e., 16 services can be stored in the memory map designated Mode 00. This is for implementation of Single DES where a current initialization vector is stored as "C-IV"; a next initialization vector is stored as "N-IV" and Current and Next values are stored for key "A". In contrast, FIG. 9d demonstrates that only 2 services can be stored by the same memory when DES-ABC4 is utilized, having 4 Initialization Vectors. Thus, as can be seen in the memory map of FIG. 9d, service S0 requires a current and next values for each of the "A", "B", and "C" keys, as well as current and next values for the four initialization vectors "IV0", "IV1", "IV2" and "IV3".

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of providing data, the method comprising:
storing a first set of encryption data associated with a first data stream wherein the first data stream includes a first number of services;
encrypting the first data stream having a first-level-of-encryption;
sending the first data stream to a destination device for decryption;
storing a second set of encryption data associated with a second data stream wherein the second data stream includes a second number of services that is different from the first number of services and is greater than one, wherein the second number of services are each available for being played at a same time by a destination device, storing the second set of encryption data includes selecting the second number of services from a total number of services desired by an end user to be made available for being played at the destination device at the same time, and the selection is made based on a priority established by the end user among the total number of services in response to a determination that the total number of services exceeds the second number of services;
encrypting the second data stream having a second-level-of-encryption, the first-level-of-encryption being different from the second-level-of-encryption;
utilizing a common memory to encrypt the first data stream at said first-level-of-encryption and to encrypt the second data stream at the second-level-of-encryption; and
sending the second data stream to the destination device for decryption.

2. The method of claim 1 wherein the first set of encryption data comprises at least one encryption key.

3. The method of claim 1 wherein the destination device comprises a set-top box.

4. The method of claim 3 further comprising storing a plurality of decryption algorithms at the set-top box.

5. The method of claim 1 wherein the first-level of encryption utilizes the Data Encryption Standard and wherein the second-level-of-encryption utilizes an encryption algorithm different from said Data Encryption Standard.

6. The method of claim 3 further comprising:
decrypting the first data stream at the set-top box; and
decrypting the second data stream at the set-top box.

7. The method of claim 1 further comprising storing a portion of the first set of encryption data in a RAM.

8. The method of claim 1 further comprising storing a portion of the first set of encryption data in a register of a microprocessor.

9. The method of claim 1, wherein storing the second set of encryption data includes storing encryption algorithm code for use by a processor in response to determining a change from the encryption of the first data stream to the encryption of the second data stream.

* * * * *